United States Patent
Zhang et al.

(10) Patent No.: US 12,515,271 B2
(45) Date of Patent: Jan. 6, 2026

(54) ANGLE-VARIABLE STIRRING AND SEPARATING DEVICE FOR HIGH-VALUE COMPONENTS OF WASTE PCB AND CONTROL METHOD THEREOF

(71) Applicant: CHANGZHOU UNIVERSITY, Jiangsu (CN)

(72) Inventors: Yi Zhang, Changzhou (CN); Meng Yan, Changzhou (CN); Xingyu Jiang, Changzhou (CN); Yuanyuan Chen, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 19/206,032

(22) Filed: May 12, 2025

(65) Prior Publication Data

US 2025/0269449 A1    Aug. 28, 2025

Related U.S. Application Data

(63) Continuation-in-part of application No. PCT/CN2022/142809, filed on Dec. 28, 2022.

(30) Foreign Application Priority Data

Nov. 25, 2022   (CN) .......................... 202211487637.9

(51) Int. Cl.
*B23K 1/018*   (2006.01)
*B01F 27/231*   (2022.01)
(Continued)

(52) U.S. Cl.
CPC .......... *B23K 1/018* (2013.01); *B01F 27/2311* (2022.01); *B09B 3/38* (2022.01);
(Continued)

(58) Field of Classification Search
CPC .... B01F 27/191; B01F 27/092; B01F 27/115; B01F 35/3203; B01F 35/71805;
(Continued)

(56) References Cited

U.S. PATENT DOCUMENTS 2,237,957 A  *  4/1941  Castor .................. B01F 27/951
                                                        475/11
2,244,765 A  *  6/1941  Christensen ............ B28C 5/165
                                                        366/288
(Continued)

FOREIGN PATENT DOCUMENTS

CA       3176399 A1    9/2021
CN     203794884 U    8/2014
(Continued)

OTHER PUBLICATIONS

International Search Report in PCT/CN2022/142809 mailed on Jul. 27, 2023, 7 pages.
(Continued)

*Primary Examiner* — Charles Cooley
(74) *Attorney, Agent, or Firm* — PORUS IP LLC

(57) ABSTRACT

A stirring and separating device for high-value components of a waste PCB and a control method thereof are disclosed. The stirring and separating device comprises an insulated outer tank for accommodating a desoldering flux. The insulated outer tank is provided with a stirring mechanism. The stirring mechanism includes a main rotation shaft. A plurality of spaced cross beams are mounted at a bottom of the main rotation shaft. Each of the cross beams is provided with a secondary rotation shaft. A bottom of each of the secondary rotation shafts is rotationally connected with a stirring wheel through at least two connecting rods. At least two connection points are formed between each of the at least two connecting rods and the stirring wheel. When any one
(Continued)

or more of the at least two connection points are disconnected, the stirring wheel rotates to a different angle.

9 Claims, 9 Drawing Sheets

(51) Int. Cl.
    *B09B 3/38*     (2022.01)
    *B09B 3/40*     (2022.01)
    *B09B 3/70*     (2022.01)
    *B09B 101/17*     (2022.01)

(52) U.S. Cl.
    CPC ............... *B09B 3/40* (2022.01); *B09B 3/70*
    (2022.01); *B09B 2101/17* (2022.01)

(58) Field of Classification Search
    CPC ...... B01F 2101/06; B01F 23/60; B01F 31/40;
    B01F 33/812; B01F 35/512; B01F 27/13;
    B01F 31/441; B01F 27/73; B01F 27/96;
    B01F 27/2324; B01F 27/95; B01F
    27/231; B01F 27/2311; B01F 27/2312;
    Y02A 40/90; B23K 1/018; B09B 3/38;
    B09B 3/40; B09B 3/70; B09B 2101/17
    USPC .......................................... 366/66, 288, 286
    See application file for complete search history.

(56) References Cited

U.S. PATENT DOCUMENTS

| | | | | |
|---|---|---|---|---|
| 3,109,632 A | * | 11/1963 | Wiegel | B01F 29/835 |
| | | | | 366/66 |
| 3,160,399 A | * | 12/1964 | Harrison | B28C 5/168 |
| | | | | 366/65 |
| 3,456,906 A | * | 7/1969 | Troy | B22C 5/044 |
| | | | | 241/110 |
| 3,456,926 A | * | 7/1969 | Hummelshoj | B28C 5/163 |
| | | | | 366/65 |
| 4,191,478 A | * | 3/1980 | Zupancic | B28C 5/0856 |
| | | | | 366/65 |
| 4,453,831 A | * | 6/1984 | Mahon | B28C 5/168 |
| | | | | 366/65 |
| 6,227,697 B1 | * | 5/2001 | Stahl | B01F 27/85 |
| | | | | 366/65 |
| 6,752,527 B2 | * | 6/2004 | Galletti | B01F 27/82 |
| | | | | 366/66 |
| 2021/0040580 A1 | | 2/2021 | Jiménez Guzmán et al. | |
| 2025/0269449 A1 | * | 8/2025 | Zhang | B09B 3/40 |

FOREIGN PATENT DOCUMENTS

| | | | | | |
|---|---|---|---|---|---|
| CN | 104511473 | A | | 4/2015 | |
| CN | 205797977 | U | | 12/2016 | |
| CN | 108057367 | A | * | 5/2018 | ......... B01F 27/0542 |
| CN | 111001648 | A | | 4/2020 | |
| CN | 111069230 | A | | 4/2020 | |
| CN | 212534056 | U | | 2/2021 | |
| CN | 112473474 | A | * | 3/2021 | ......... B01F 35/7545 |
| CN | 113144976 | A | * | 7/2021 | ............ B01F 27/232 |
| CN | 116941474 | A | * | 10/2023 | ............ A01G 18/22 |
| DE | 102021109856 | A1 | | 10/2022 | |
| EP | 1256373 | A1 | * | 11/2002 | ........... B01F 27/073 |
| JP | 2005318983 | A | | 11/2005 | |

OTHER PUBLICATIONS

Written Opinion in PCT/CN2022/142809 mailed on Jul. 27, 2023, 5 pages.

* cited by examiner

ANGLE-VARIABLE STIRRING AND SEPARATING DEVICE FOR HIGH-VALUE COMPONENTS OF WASTE PCB AND CONTROL METHOD THEREOF

CROSS-REFERENCE TO RELATED APPLICATIONS

This application is a Continuation-in-part of International Application No. PCT/CN2022/142809, filed on Dec. 28, 2022, which claims priority to Chinese Application No. 202211487637.9, filed on Nov. 25, 2022, the entire contents of each of which are incorporated herein by reference.

TECHNICAL FIELD

The present disclosure relates to the technical field of PCB recycling, and in particular to a stirring and separating device for high-value components of a waste PCB and a control method thereof.

BACKGROUND

Waste printed circuit boards (PCBs), as the primary component of "electronic waste", have seen exponentially increasing volumes due to rapid obsolescence of electronic products. These discarded PCBs contain toxic heavy metals (e.g., lead, chromium, and mercury) and substantial organic compounds, which cause environmental pollution and adversely impact daily life and public health. Approximately 20 types of non-ferrous and rare metals are present in the waste PCBs, along with reusable high-value components, endowing them with significant recycling potential and economic value. Reasonable recycling of the waste PCBs can alleviate mineral resource shortages while reducing environmental contamination. Current disposal methods for the waste PCBs primarily include: landfill disposal, pyrometallurgical smelting, mechanical pulverization, and hydrometallurgical leaching. However, these treatment approaches may release toxic substances causing secondary environmental pollution, and fail to recover reusable high-value components, resulting in resource waste and poor economic benefits.

Therefore, it is desirable to provide a stirring and separating device for high-value components of a waste PCB and a control method thereof, which can reduce the secondary pollution to the environment and waste of resources, and improve the economic benefits.

SUMMARY

One or more embodiments of the present disclosure provide a stirring and separating device for high-value components of a waste PCB. The stirring and separating device may include: an insulated outer tank for accommodating a desoldering flux. The desoldering flux reacts with soldered portions of the high-value components on the waste PCB for decomposition, so that the high-value components may be separated from the waste PCB, thus recycling the high-value components. The insulated outer tank may be provided with a stirring mechanism. The stirring mechanism may include a main rotation shaft. The main rotation shaft may be connected with an output shaft of a main motor. The main motor may be configured to drive the main rotation shaft to rotate. A plurality of spaced cross beams may be mounted at a bottom of the main rotation shaft, and each of the cross beams may be provided with a secondary rotation shaft. A bottom of each of the secondary rotation shafts may be rotationally connected with a stirring wheel through at least two connecting rods. At least two connection points may be formed between each of the at least two connecting rods and the stirring wheel. When any one or more of the at least two connection points are disconnected, the stirring wheel may rotate to a different angle.

In some embodiments, a bottom of each of the at least two connecting rods may be provided with a spherical connecting portion. A top of the stirring wheel may be provided with a plurality of connecting assemblies. Each of the plurality of connecting assemblies may include an upper connecting portion and a lower connecting portion.

The upper connecting portion may be provided with an upper groove with a groove opening facing downward. The lower connecting portion may be provided with a lower groove with a groove opening facing upward. The upper connecting portion and the lower connecting portion may be enclosed to form a spherical groove for mounting the spherical connecting portion. The spherical connecting portion is rotatable in the spherical groove to form a universal shaft structure. An electromagnet may be disposed between the upper connecting portion and the lower connecting portion, and the upper connecting portion, the lower connecting portion, the spherical connecting portion, and the spherical groove may correspond to the electromagnet in a one-to-one manner, thereby forming the at least two connection points.

In some embodiments, a portion of the lower connecting portion located on an outer side of the lower groove may be provided with a clamping groove. The electromagnet may correspond to the clamping groove in a one-to-one manner. Each electromagnet may be fixed at a bottom of the corresponding clamping groove. The upper connecting portion may protrude in a direction of the clamping groove to form a clamping portion, and the clamping portion may be clamped into the corresponding clamping groove.

In some embodiments, each of the cross beams may be provided with a slideway along a length direction of the cross beam, and a top of the secondary rotation shaft may be embedded in the slideway and slidingly connected with the slideway.

In some embodiments, each of the at least two connecting rods may include a horizontal rod and a vertical rod which are rotationally connected, and the vertical rod may be a retractable structure.

In some embodiments, an inner tank may be disposed in the insulated outer tank. An outer side wall of the inner tank may be provided with a first heating piece, an inner bottom wall of the inner tank may be provided with a second heating piece, and a temperature sensor, a flow rate sensor, and a mass detector may be disposed on an inner side wall of the inner tank.

In some embodiments, a top of the inner tank may be provided with a nozzle, a connection line may be disposed between the nozzle and a bottom of the inner tank, and the connection line may be provided with a pump body.

In some embodiments, the main rotation shaft may be a retractable structure.

In some embodiments, the insulated outer tank may be provided with a top cover, a side wall of the insulated outer tank may be rotationally connected with a cylinder through a rotating rod, an output shaft of the cylinder may be connected with the top cover, and a cylinder body of the cylinder may be connected with an output shaft of a drive motor.

One or more embodiments of the present disclosure further provide a control method of a stirring and separating device for high-value components of a waste PCB.

The control method may include following operations:

S1: a control system controlling an output shaft of a cylinder to extend to drive a top cover to rise to a set height, causing a stirring mechanism to be completely detached from an insulated outer tank, and a drive motor driving the cylinder to rotate counterclockwise by 90° to open the top cover;

S2: setting an initial level of a desoldering flux, injecting the desoldering flux into an inner tank until reaching a height of the initial level of the desoldering flux, setting a heating temperature, activating a first heating piece to preheat the desoldering flux in the inner tank, and after heating to a desired temperature, the first heating piece performing constant temperature control;

S3: setting a reaction level of the desoldering flux, placing the waste PCB into the inner tank to cause the waste PCB to be completely submerged in the desoldering flux after a level of the desoldering flux reaches a set position, and stopping adding the waste PCB;

S4: the drive motor driving the cylinder to rotate clockwise by 90°, the control system controlling the output shaft of the cylinder to retract to cause the top cover to contact a top of the insulated outer tank to form a seal, and setting an initial stirring duration, an initial stirring speed, and an initial stirring direction;

S5: activating a second heating piece to cooperate with the first heating piece to make a temperature of the desoldering flux rapidly increase to a secondary set temperature, and stopping heating;

S6: when the temperature of the desoldering flux reaches the secondary set temperature, driving a main rotation shaft and secondary rotation shafts to rotate, activating a pump body to pump the desoldering flux from a bottom of the inner tank to a top for spraying, after rotation for 5 minutes, controlling the main rotation shaft to move up and down while rotating and controlling a plurality of electromagnets to be energized or de-energized to connect or disconnect a plurality of connection points between at least two connecting rod and a stirring wheel so as to control a stirring direction of the stirring wheel;

S7: when the temperature sensor detects a drop in the temperature, activating the first heating piece and the second heating piece again to increase the temperature to a temperature required for desoldering;

S8: at the end of the initial stirring duration, the control system controlling the main rotation shaft and the secondary rotation shafts to stop, and then activating reverse rotation;

S9: as stirring proceeds, the desoldering flux continuously reacting with soldered portions of the high-value components for decomposition, a mass of the desoldering flux gradually decreasing, and when the mass decreases to a certain value, the control system reducing rotation speeds of the main rotation shaft and the secondary rotation shafts;

S10: the control system automatically adjusting the stirring duration according to a proportion of the desoldering flux and the high-value components, and when the mass of the desoldering flux drops to the certain value, stopping the stirring, turning off the stirring mechanism, and the main rotation shaft retracting to the top, so that the stirring is completed.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

Figure 1:
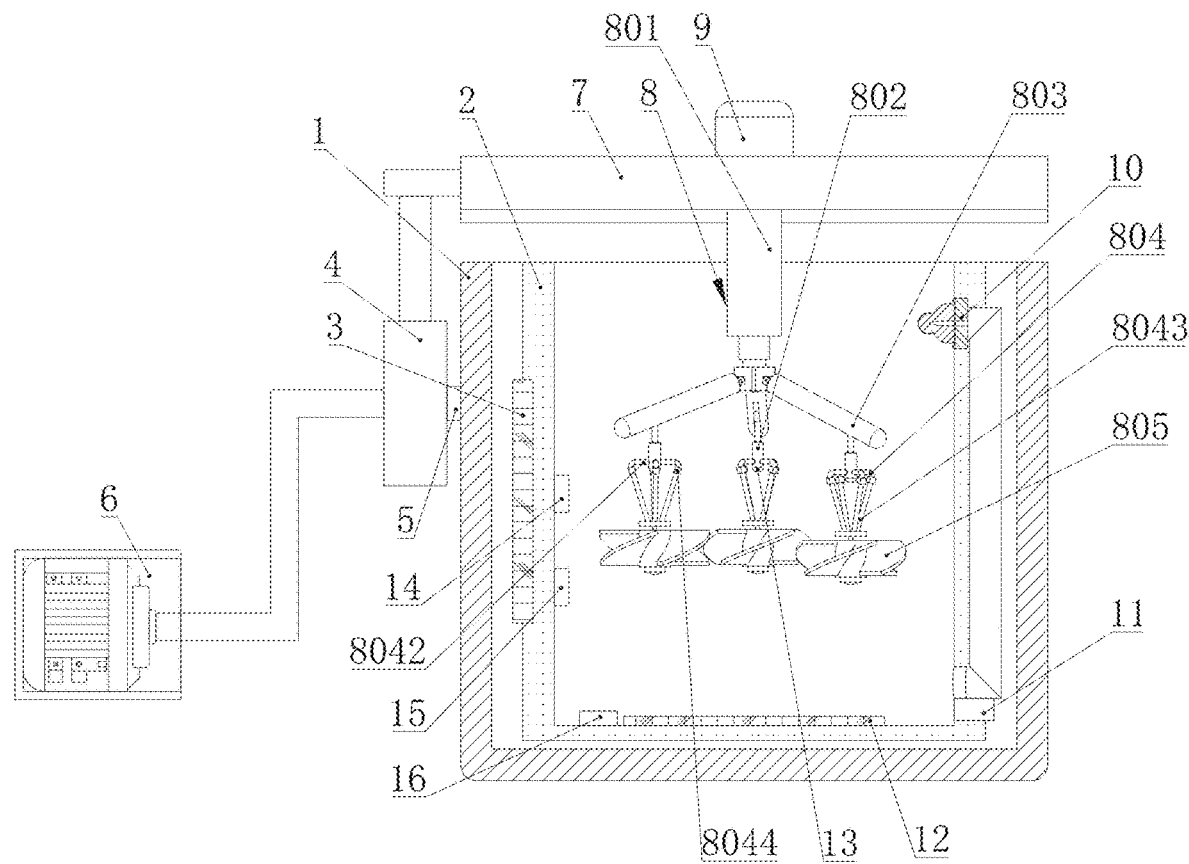
FIG. 1 is a schematic structural diagram illustrating a stirring and separating device for high-value components of a waste PCB according to some embodiments of the present disclosure.

Reference signs in the figures:

1, insulated outer tank; 2, inner tank; 3, first heating piece; 4, cylinder; 5, rotating rod; 6, drive motor; 7, top cover; 8, stirring mechanism; 801, main rotation shaft; 802, secondary rotation shaft; 803, cross beam; 8031, slideway; 804, connecting rod; 8041, spherical connecting portion; 8042, horizontal rod; 8043, vertical rod; 8044, telescopic motor; 805, stirring wheel; 8051, upper connecting portion; 8052, lower connecting portion; 8053, spherical groove; 8054, clamping groove; 8055, clamping portion; 806, electromagnet; 9, main motor; 10, nozzle; 11, pump body; 12, second heating piece; 13, secondary motor; 14, temperature sensor; 15, flow rate sensor; 16, mass detector.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one," "a," "an," "one kind," and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a device or control system according to embodiments of the present disclosure. It should be appreciated that the preceding or following operations are not necessarily performed in an exact sequence. Instead, steps can be processed in reverse order or simultaneously. Also, it is possible to add other operations to these processes or to remove a step or steps from these processes.

Figure 2:
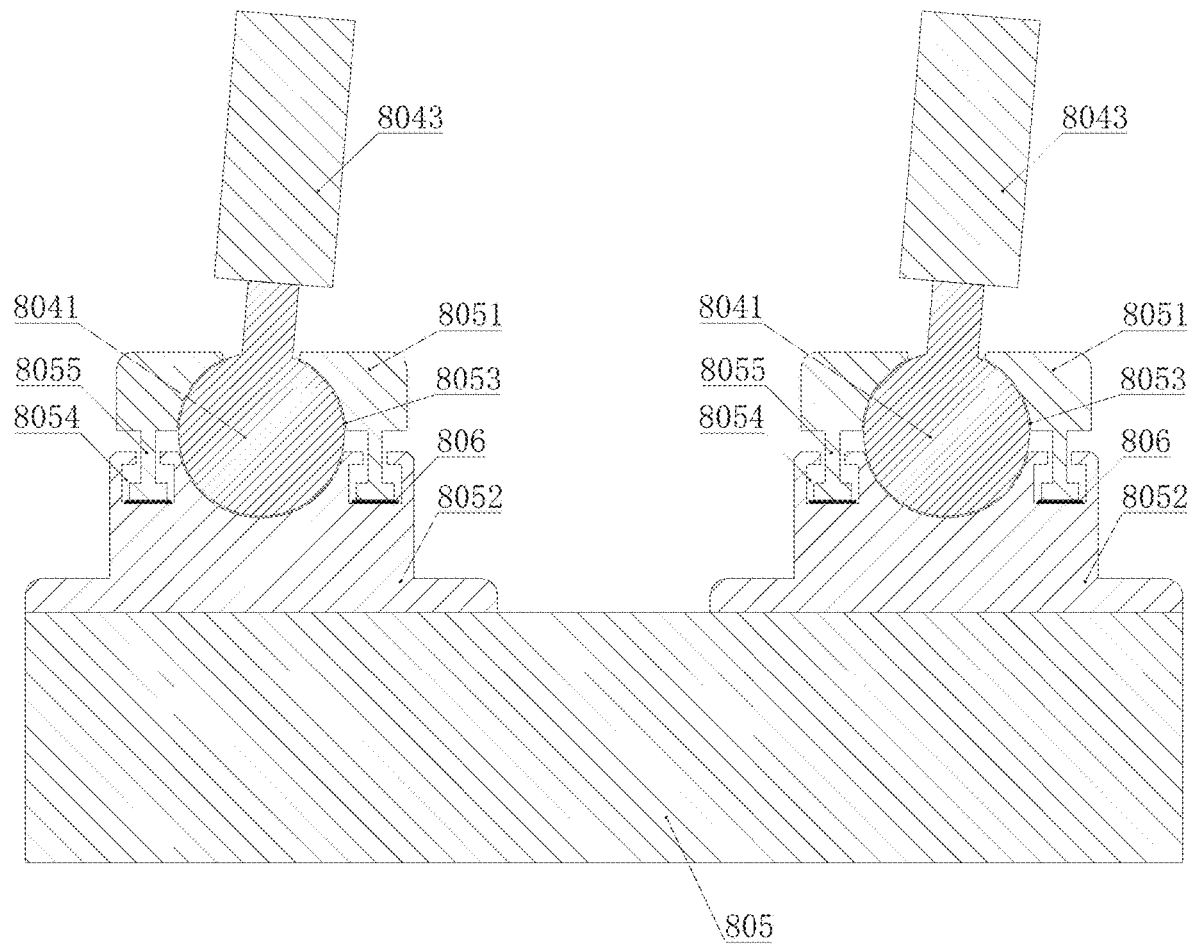
FIG. 2 is a schematic structural diagram illustrating all electromagnets being energized according to some embodiments of the present disclosure.
Figure 3:
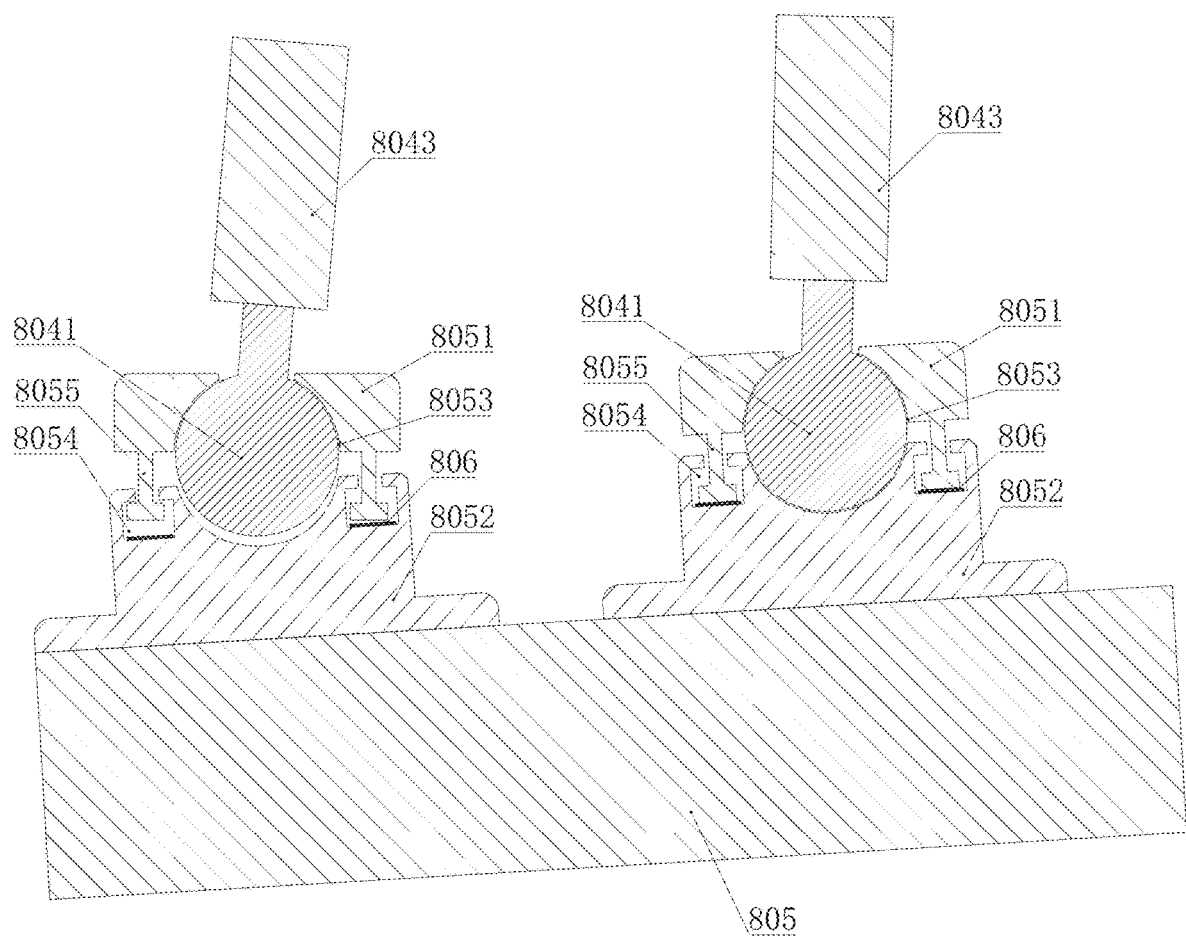
FIG. 3 is a schematic structural diagram illustrating part of electromagnets being de-energized according to some embodiments of the present disclosure.
Figure 4:
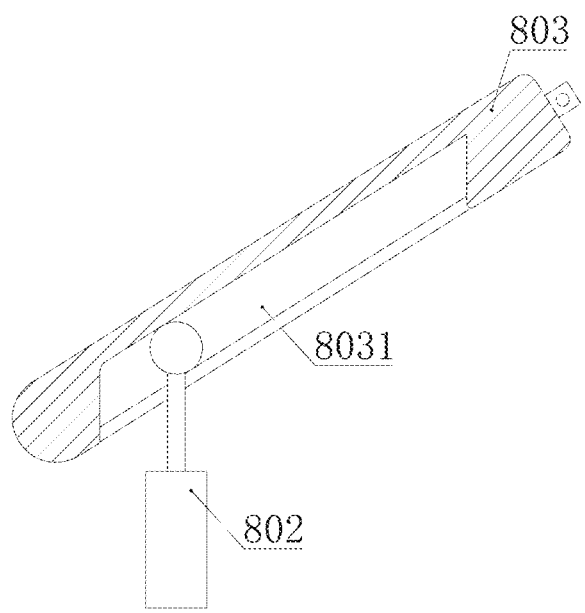
FIG. 4 is a schematic structural diagram illustrating a cross beam being connected with a secondary rotation shaft according to some embodiments of the present disclosure.

FIG. 1 is a schematic structural diagram illustrating a stirring and separating device for high-value components of a waste PCB according to some embodiments of the present disclosure. FIG. 2 is a schematic structural diagram illustrating all electromagnets being energized according to some embodiments of the present disclosure. FIG. 3 is a schematic structural diagram illustrating part of electromagnets being de-energized according to some embodiments of the present disclosure. FIG. 4 is a schematic structural diagram illustrating a cross beam being connected with a secondary rotation shaft according to some embodiments of the present disclosure.

Some embodiments of the present disclosure provide a stirring and separating device for high-value components of a waste PCB (hereinafter referred to as the device). As shown in FIGS. 1-4, the device may include an insulated outer tank 1. An inner tank 2 may be disposed in the insulated outer tank 1, and the inner tank 2 may be provided with a stirring mechanism 8. The stirring mechanism 8 may include a main rotation shaft 801. A plurality of spaced cross beams 803 may be mounted at a bottom of the main rotation shaft 801, and each of the cross beams 803 may be provided with a secondary rotation shaft 802. A bottom of each of the secondary rotation shafts 802 may be rotationally connected with a stirring wheel 805 through at least two connecting rods 804. At least two connection points may be formed between each of the at least two connecting rods 804 and the stirring wheel 805. When any one or more of the at least two connection points are disconnected, the stirring wheel 805 may rotate to a different angle. During operation, a desoldering flux and the waste PCB are placed into the inner tank 2, and the desoldering flux reacts with soldered portions of the high-value components on the waste PCB for decomposition, so that the high-value components are separated from the waste PCB, thus recycling the high-value components.

The stirring mechanism 8 refers to a mechanism for crushing and mixing the desoldering flux and the waste PCB and separating the high-value components from the waste PCB. In some embodiments, the stirring mechanism 8 may include at least one of a mechanical stirrer, a vibratory stirring mechanism, an ultrasonic-assisted stirrer, or the like. More descriptions regarding the stirring mechanism may be found in related descriptions below.

A cavity may be provided between an inner peripheral wall of the insulated outer tank 1 and an outer peripheral wall of the inner tank 2. The cavity may be configured to reduce heat dissipation, making the preheating of the device more efficient. An outer side wall of the inner tank 2 may be provided with a first heating piece 3, an inner bottom wall of the inner tank 2 may be provided with a second heating piece 12, and a temperature sensor 14, a flow rate sensor 15, and a mass detector 16 may be disposed on an inner side wall of the inner tank 2. The second heating piece 12 may be waterproofed, and the first heating piece 3 and the second heating piece 12 may provide a reaction temperature to accelerate the separation efficiency.

The temperature sensor 14 may be configured to detect a temperature (i.e., a stirring temperature) inside the inner tank 2 in real time. For example, the temperature sensor 14 may include at least one of an infrared thermometer, a fiber-optic temperature sensor, a thermocouple, or the like. The flow rate sensor 15 may be configured to detect a flow rate of the desoldering flux in the stirring mechanism 8. For example, the flow rate sensor 15 may include at least one of a turbine flow meter, an electromagnetic flow meter, an ultrasonic flow meter, or the like. The mass detector 16 may be configured to detect a mass of a crushed material and/or the desoldering flux. For example, the mass detector 16 may include at least one of an X-ray fluorescence spectrometer, a metal detector, or the like.

By setting the temperature sensor 14, the flow rate sensor 15, and the mass detector 16, the device can adjust the stirring speed based on the stirring temperature to ensure that the high-value components are not damaged due to a high temperature.

In some embodiments, a waste heat exchange pipeline (not shown in the figures) may be provided between the inner tank 2 and the insulated outer tank 1, and a desoldering flux injection valve (not shown in the figures) may be provided on the inner tank 2.

The waste heat exchange pipeline refers to a pipeline for recovering excess heat generated by the first heating piece 3 and the second heating piece 12. For example, the waste heat exchange pipeline may be one of a spiral pipeline, a straight pipeline, or the like. In some embodiments, those skilled in the art or the device may recover the excess heat generated by the first heating piece 3 and the second heating piece 12, and/or inject a desoldering flux for next use into the waste heat exchange pipeline, and preheat the desoldering flux using the recovered excess heat. In some embodiments, the waste heat exchange pipeline may be made of a high temperature and corrosion resistant material (e.g., one of stainless steel, PTFE, etc.).

The desoldering flux injection valve may be configured to inject a preheated desoldering flux into the inner tank 2. For example, the desoldering flux injection valve may include one of a ball valve, a solenoid valve, or the like. In some embodiments, the desoldering flux injection valve may be provided on a side wall of the inner tank 2.

In some embodiments of the present disclosure, the waste heat exchange pipeline not only recovers the excess heat generated by the first heating piece 3 and the second heating piece 12, but also preheats the desoldering flux for next use injected into the waste heat exchange pipeline, thereby reducing energy consumption.

In some embodiments, as shown in FIG. 1, the insulated outer tank 1 may be provided with a top cover 7, a side wall of the insulated outer tank 1 may be rotationally connected with a cylinder 4, an output shaft of the cylinder 4 may be connected with the top cover 7, and a cylinder body of the cylinder 4 may be connected with an output shaft of a drive motor 6.

In some embodiments, a sealing rubber ring may be fixedly connected to a bottom of the top cover 7 to ensure that the desoldering flux does not splash out of the tank during stirring, which ensures safety during stirring. The side wall of the insulated outer tank 1 may be rotationally connected with the cylinder 4 through a rotating rod 5, an output shaft of the cylinder 4 may be connected with the top cover 7, and the cylinder body of the cylinder 4 may be connected with the output shaft of the drive motor 6. When the top cover 7 is opened, the device (e.g., a control system) first controls the output shaft of the cylinder 4 to extend, so as to drive the top cover 7 to rise to a position where the stirring mechanism 8 is completely detached from the insulated outer tank 1, and then the drive motor 6 drives the cylinder 4 to rotate counterclockwise by 90° to open the top cover 7; when the top cover 7 is closed, the drive motor 6 first drives the cylinder 4 to rotate clockwise by 90°, and then the output shaft of the cylinder 4 retracts, so as to drive the top cover 7 to drop to a position where the top cover 7 contacts a top of the insulated outer tank 1. The drive motor 6 may include one of a stepping motor, a servo motor, or the like.

In some embodiments, the top cover 7 may be provided with an image acquisition device (not shown in the figures).

The image acquisition device may be configured to acquire a real-time stirring image during stirring of the stirring mechanism 8. For example, the image acquisition device may include at least one of a camera, an infrared camera, or the like. In some embodiments, the image acquisition device may be disposed on a bottom surface of the top cover 7 to acquire the real-time stirring image during stirring of the stirring mechanism 8. More descriptions regarding the real-time stirring image may be found in FIG. 6 and the related descriptions thereof.

In some embodiments of the present disclosure, the image acquisition device is arranged to acquire the real-time stirring image, which facilitates the device to determine the next operation based on the real-time stirring image subsequently.

In some embodiments, as shown in FIG. 1, a top of the inner tank 2 may be provided with a nozzle 10, a connection pipeline may be disposed between the nozzle 10 and a bottom of the inner tank 2, the connection pipeline may be provided with a pump body 11, and the pump body 11 may be configured to pump the desoldering flux from the bottom of the inner tank 2 to the top for spraying.

In some embodiments, as shown in FIG. 1, the stirring mechanism 8 may include a main rotation shaft 801. The main rotation shaft 801 may be connected with an output shaft of a main motor 9. The main motor 9 may be fixed on the top cover 7 and configured to drive the main rotation shaft 801 to rotate, and the main rotation shaft 801 may be a retractable structure. The plurality of spaced cross beams 803 may be hinged to the bottom of the main rotation shaft 801. In this embodiment, three cross beams 803 are provided. In some embodiments, two, four, or more cross beams 803 may be provided. A count of the plurality of cross beams 803 is not limited here.

In some embodiments, as shown in FIG. 1 and FIG. 4, the each of the cross beams 803 may be provided with a secondary rotation shaft 802, and each of the cross beams 803 may be provided with a slideway 8031 along a length direction of the cross beam 803. A top of the secondary rotation shaft 802 may be embedded in the slideway 8031 and slidably connected with the slideway 8031. The control system may control the secondary rotation shaft 802 to slide on the corresponding cross beam 803. The secondary rotation shaft 802 may be connected to an output shaft of a secondary motor 13. The secondary motor 13 may be configured to drive the secondary rotation shaft 802 to rotate, and the secondary motor 13 may be a waterproof motor. The bottom of the each of the secondary rotation shafts 802 may be rotationally connected with the stirring wheel 805 through the at least two connecting rods 804. In this embodiment, four connecting rods 804 are provided. In some embodiments, two, three, or more connecting rods 804 may be provided. A count of the connecting rods 804 is not limited here. Four connection points are formed between the four connecting rods 804 and the stirring wheel 805, and the four connection points are evenly distributed. When any one or more of the four connection points are disconnected, the stirring wheel 805 rotates to a different angle; when all the connection points are in a connected state, the stirring wheel 805 is in a horizontal state; and when one of the connection points is disconnected, the stirring wheel 805 rotates in a direction opposite to the disconnected connection point. Disconnecting the connection points of different counts or different positions may cause the stirring wheel 805 to rotate to the different angle. Accordingly, a stirring depth and a stirring orientation of the stirring wheel 805 can be adjusted by controlling the main rotation shaft 801 to expand and contract, sliding of the secondary rotation shaft 802 on the corresponding cross beam 803, and rotation of the each of the cross beams 803. The stirring mechanism 8 may be covered with silicone to prevent the high-value components from being damaged during stirring.

The main motor 9 and the secondary motor 13 may include one of a stepping motor, a servo motor, or the like.

The control system is a system that controls operation of various components of the device. In some embodiments, the control system may be partially or fully integrated into the device. The control system may include at least one memory and at least one processor. The at least one memory and the at least one processor may be configured to store and process a plurality of data and commands during operation of the device. For example, the at least one memory may include at least one of an SRAM, a DRAM, a Flash, etc.; and the at least one processor may include at least one of a CPU, a GPU, a DSP, etc.

In some embodiments, as shown in FIGS. 1-3, each of the at least two connecting rods 804 may include a horizontal rod 8042 and a vertical rod 8043 which are rotationally connected. The horizontal rod 8042 and the vertical rod 8043 may be connected in a shape of "7". The vertical rod 8043 may be a retractable structure, and an end of the horizontal rod 8042 away from the vertical rod 8043 may be rotationally connected with the secondary rotation shaft 802.

In some embodiments, a bottom (e.g., a bottom of the vertical rod) of each of the at least two connecting rods 804 may be provided with a spherical connecting portion 8041. A top of the stirring wheel 805 may be provided with a plurality of connecting assemblies. Each of the plurality of connecting assemblies may include an upper connecting portion 8051 and a lower connecting portion 8052. The upper connecting portion 8051 may be provided with an upper groove with a groove opening facing downward, and the lower connecting portion 8052 may be provided with a lower groove with a groove opening facing upward. The upper connecting portion 8051 and the lower connecting portion 8052 may be enclosed to form a spherical groove 8053 for mounting the spherical connecting portion 8041. The spherical connecting portion 8041 is rotatable in the spherical groove 8053 to form a universal shaft structure. An electromagnet 806 may be disposed between the upper connecting portion 8051 and the lower connecting portion 8052. Four upper connecting portions 8051, four lower connecting portions 8052, four spherical connecting portions 8041, and four spherical grooves 8053 correspond to four electromagnets 806 in a one-to-one manner, thereby forming the four connection points.

In some embodiments, as shown in FIGS. 2-3, a portion of the lower connecting portion 8052 located on an outer side of the lower groove may be provided with a clamping groove 8054. A plurality of (e.g., four) electromagnets 806 correspond to a plurality of (e.g., four) clamping grooves 8054 in a one-to-one manner. Each of the plurality of electromagnets 806 may be fixed at a bottom of the corresponding clamping groove 8054. The upper connecting portion 8051 may protrude in a direction of the clamping groove 8054 to form a clamping portion 8055. The clamping portion 8055 may be clamped into the corresponding clamping groove 8054. A cross-section of the clamping portion 8055 may be a T-shaped structure. A vertical section of the clamping portion 8055 may extend into the clamping groove 8054, a horizontal section of the clamping portion 8055 may be clamped in the clamping groove 8054, and a cross-sectional area of the horizontal section may be less than a cross-sectional area of a body of the clamping groove 8054 and greater than a cross-sectional area of an opening of the clamping groove 8054. A height of the horizontal section may be than a depth of the clamping groove 8054, so that the clamping portion 8055 has a certain rotation amplitude inside the clamping groove 8054.

When each of the plurality of electromagnets 806 is energized, each clamping portion 8055 is engaged with the corresponding electromagnet 806 through magnetic attraction, each upper connecting portion 8051 is connected with the corresponding lower connecting portion 8052, and both each upper connecting portion 8051 and the corresponding lower connecting portion 8052 are in the horizontal state, so that the stirring wheel 805 is in the horizontal state.

When one or more electromagnets 806 are de-energized, one or more corresponding clamping portions 8055 are separated from the one or more electromagnets 806, one or more upper connecting portions 8051 are separated from one or more corresponding lower connecting portions 8052, and the one or more lower connecting portions 8052 are tilted, thereby causing the stirring wheel 805 to tilt. The control system may control the rotation of each horizontal rod 8042 and each vertical rod 8043 and the expansion and contraction of each vertical rod 8043 to cooperate with the rotation of the spherical connecting portion 8041. The upper connecting portions 8051 and the lower connecting portions 8052 are not completely separated due to clamping of the clamping portions 8055 and the clamping grooves 8054, thereby ensuring the stability of the stirring mechanism 8.

In some embodiments, two spring pins (not shown in the figures) may be provided on an inner wall of each of the clamping grooves 8054. For example, two electromagnetic members for adsorbing the two spring pins (i.e., the two electromagnetic members are different electromagnets from the plurality of electromagnet 806) may be provided on inner walls on two sides of the opening of the clamping groove 8054. The two spring pins may be made of metal (e.g., carbon steel), the two spring pins may be adsorbed on the two energized electromagnetic members, and an energized/de-energized state of the two electromagnetic members may be independent of an energized/de-energized state of the plurality of electromagnets 806.

The two spring pins may be configured to fix the clamping portion 8055 to avoid oscillation of the stirring wheel 805. In some embodiments, when the plurality of electromagnets 806 are in the energized state, the two electromagnetic members are energized, the two spring pins are adsorbed on the two electromagnetic members, and the two spring pins are in a compressed state. When the one or more electromagnets 806 are in the de-energized state or a malfunction occurs (e.g., the one or more electromagnets 806 are energized without magnetism or with unstable magnetism due to factors such as aging of coil insulation, breakage of a conductor wire, or rusting of a magnetic core, etc.), the control system may control the two electromagnetic members to de-energize, so that the two spring pins restore deformation and abut against the two sides of the clamping portion 8055, preventing the clamping portion 8055 from deflecting to maintain the stability of the stirring wheel 805.

In some embodiments of the present disclosure, by providing the two spring pins on the inner wall of each clamping groove, a stirring malfunction due to a malfunction of a power supply system of the plurality of electromagnets or a malfunction of the plurality of electromagnets can be avoided.

FIG. 5(a), FIG. 5(b), FIG. 5(c), and FIG. 5(d) are flowcharts illustrating an exemplary control method of a stirring and separating device for high-value components of a waste PCB according to some embodiments of the present disclosure.

Figure 5A:
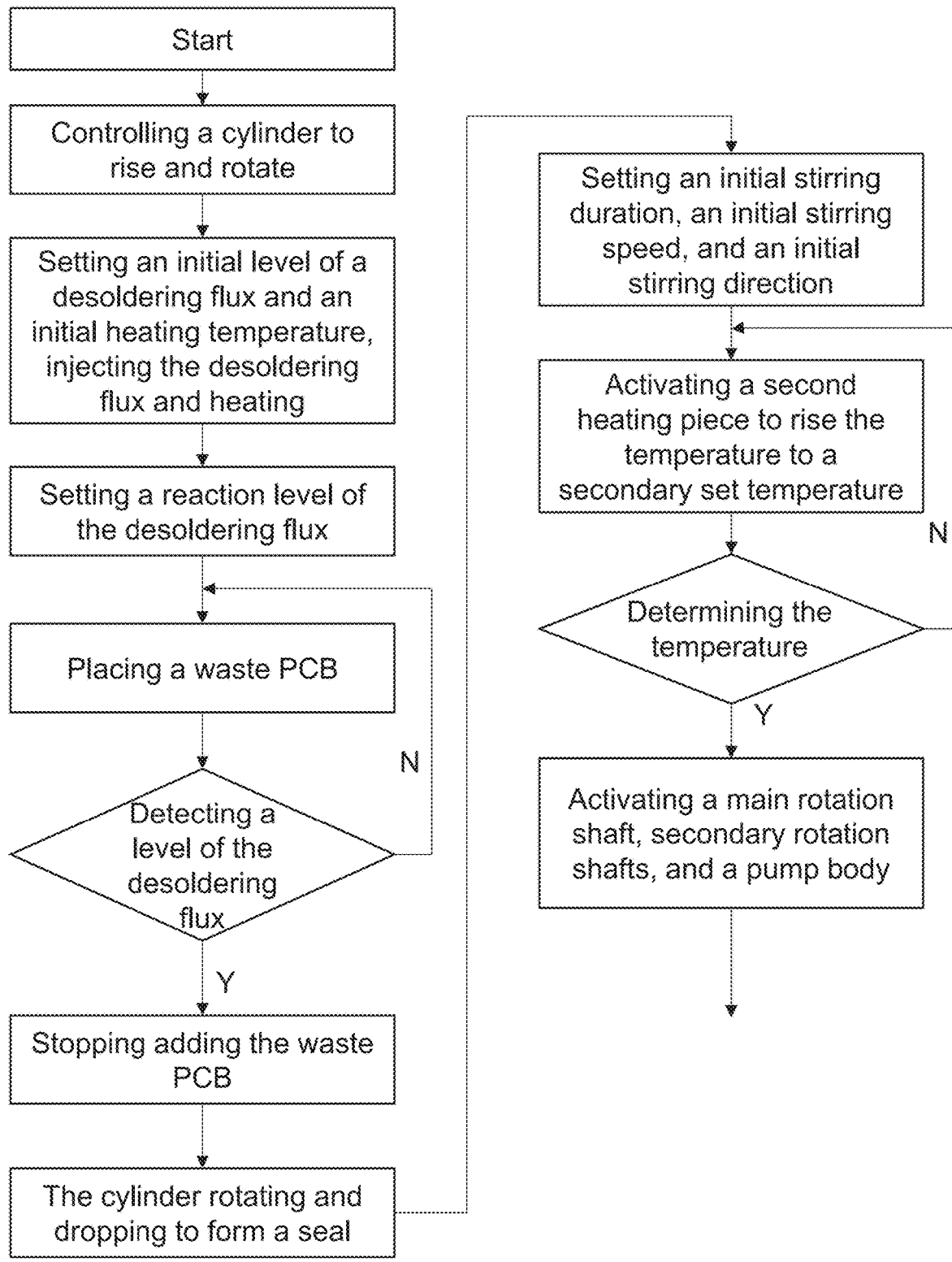
FIG. 5($a$), FIG. 5($b$), FIG. 5($c$), and FIG. 5($d$) are flowcharts illustrating an exemplary control method of a stirring and separating device for high-value components of a waste PCB according to some embodiments of the present disclosure.
Figure 5B:
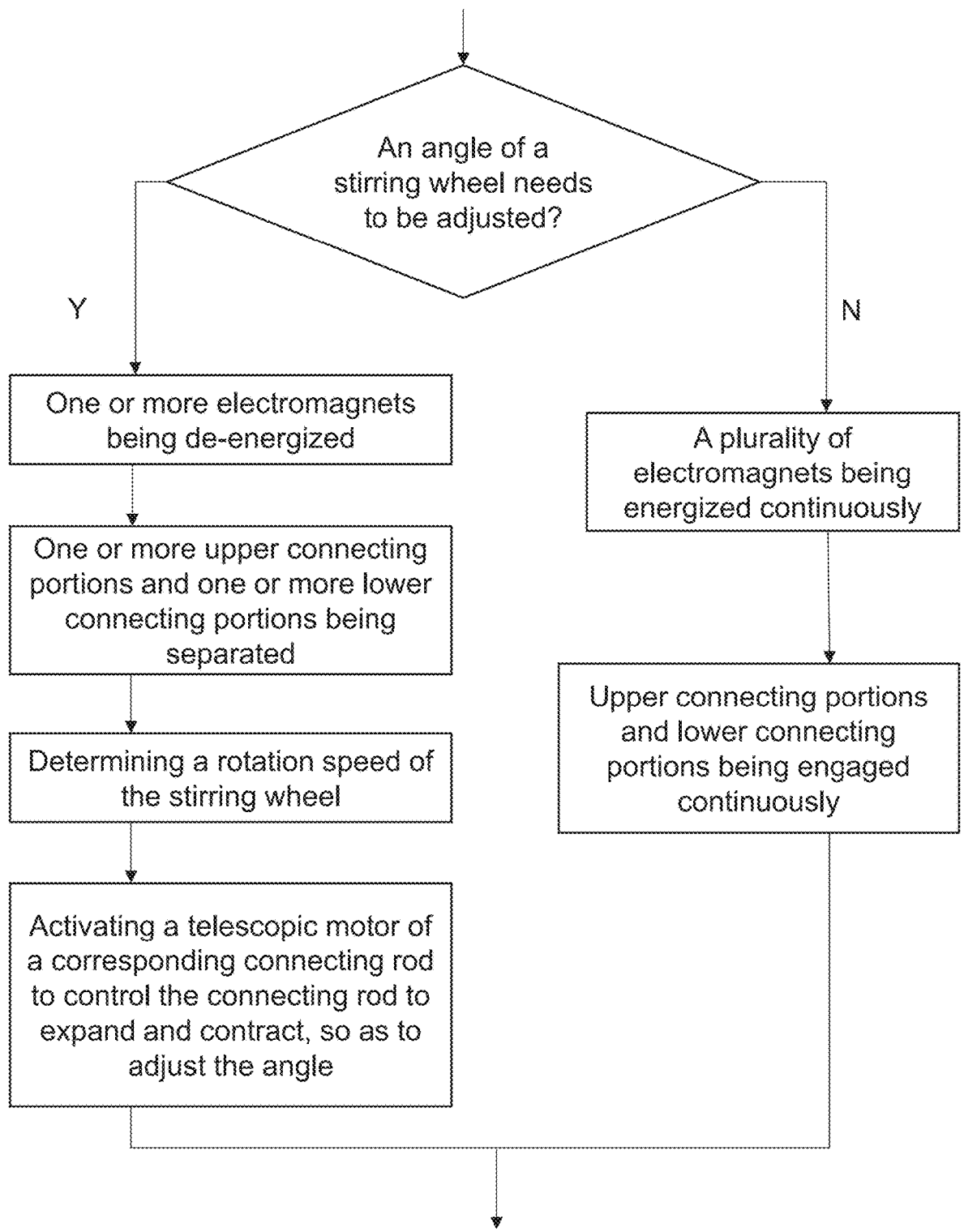
Figure 5C:
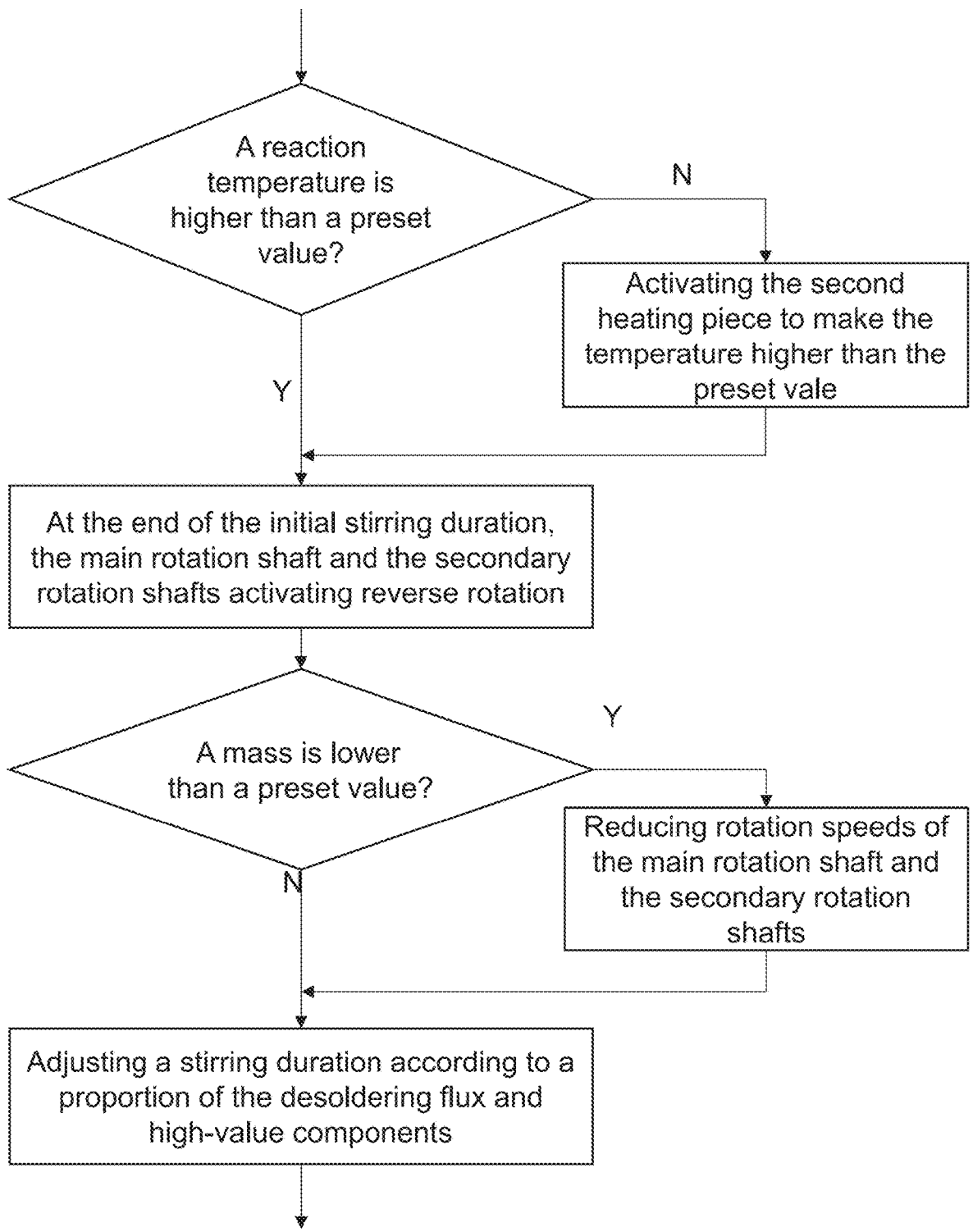
Figure 5D:
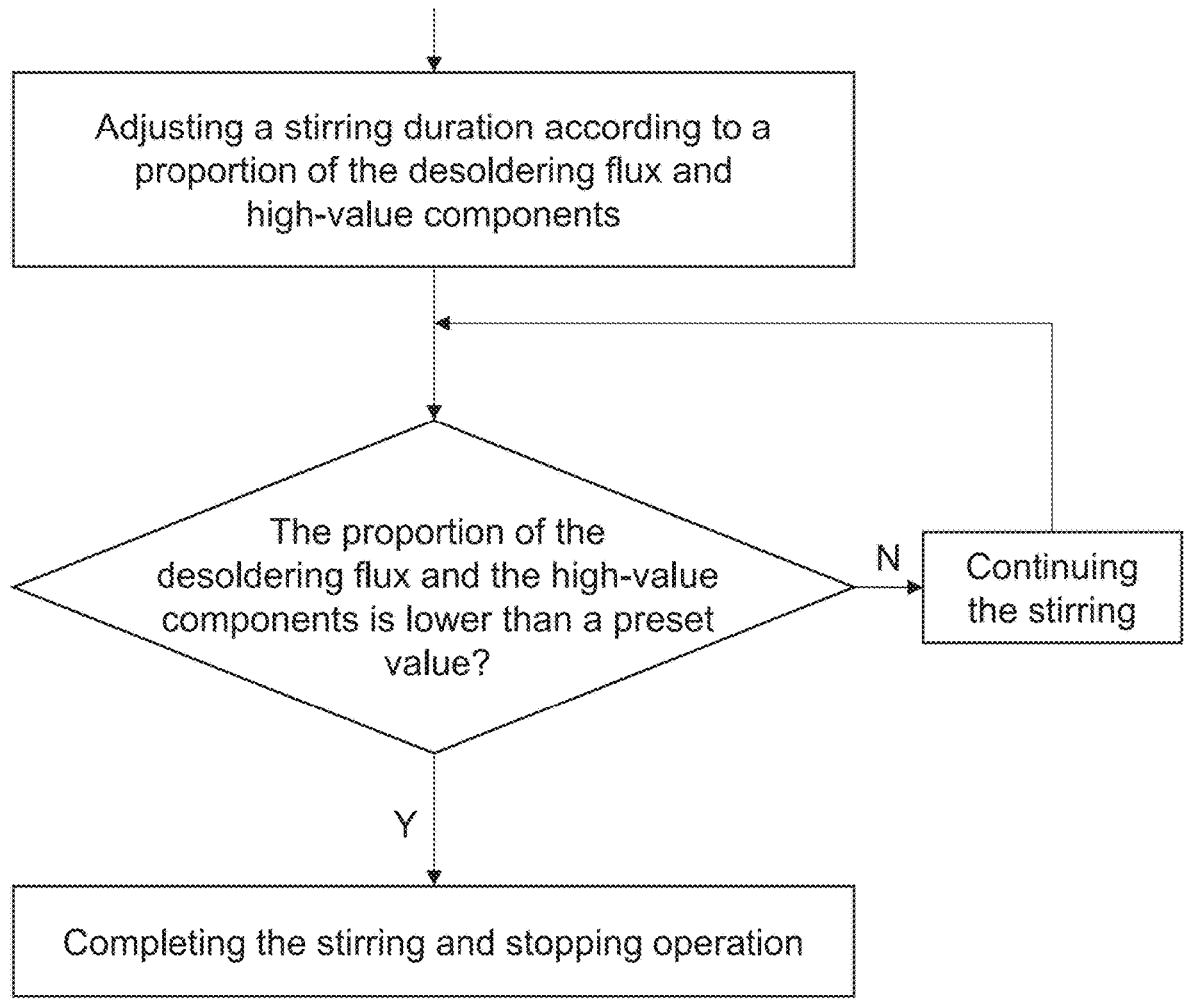

Some embodiments of the present disclosure further provide a control method of a stirring and separating device for high-value components of a waste PCB (hereinafter referred to as the control method). The control method may be performed by the device. As shown in FIGS. 5(a)-5(c), the control method may include the following operations:

In S1, a control system controlling an output shaft of the cylinder 4 to extend to drive the top cover 7 to rise to a set height, causing the stirring mechanism 8 to be completely detached from the insulated outer tank 1, and the drive motor 6 driving the cylinder 4 to rotate counterclockwise by 90° to open the top cover 7.

The set height refers to a height at which the cylinder 4 drives the top cover 7 up so that the stirring mechanism 8 is completely detached from the insulated outer tank 1. In some embodiments, the set height may be set in advance by those skilled in the art based on experience.

In S2, setting an initial level of a desoldering flux, injecting the desoldering flux into the inner tank 2 until reaching a height of the initial level of the desoldering flux, setting a heating temperature, activating the first heating piece 3 to preheat the desoldering flux in the inner tank 2, and after heating to a desired temperature, the first heating piece 3 performing constant temperature control.

The initial level of the desoldering flux refers to an initial level height of the desoldering flux injected into the inner tank 2. The heating temperature refers to a temperature required for the first heating piece 3 to preheat the desoldering flux. The desired temperature refers to a temperature that the desoldering flux needs to reach after being heated, i.e., the heating temperature. In some embodiments, the initial level of the desoldering flux and the heating temperature may be set in advance by those skilled in the art based on experience.

In some embodiments, the control system may determine a first position and a first distribution of the waste PCB by a high-precision vision system before the waste PCB is put into the inner tank 1; determine a second position and a second distribution of the waste PCB based on the first position and the first distribution; determine a robotic arm cutting parameter based on the second position and the second distribution; and control a robotic arm to accurately locate and pre-cut a weak region based on the robotic arm cutting parameter.

The high-precision vision system may be configured to recognize and cut the waste PCB. In some embodiments, the high-precision vision system may be integrated with an industrial camera (e.g., X-ray imaging, infrared radiography, etc.), the robotic arm (e.g., a six-axis robotic arm, etc.), a cutting component (e.g., a laser or a mechanical cutter, etc.), etc. The industrial camera may be configured to acquire image data of the waste PCB. In some embodiments, the high-precision vision system may also be integrated with an image recognition model, etc.

The first position refers to pixel coordinates of the high-value components on the waste PCB recognized and acquired by the high-precision vision system. The first distribution refers to pixel coordinates of a plurality of solder spots on the waste PCB and a type of material used for each of the plurality of solder spots recognized and acquired by the high-precision vision system.

In some embodiments, the control system may determine the first position and the first distribution of the waste PCB by the industrial camera and the image recognition model of the high-precision vision system. The image recognition model may be a machine learning model. For example, the image recognition model may be a Convolutional Neural Network (CNN) model, or the like, or any combination of one or more of other customized models.

In some embodiments, an input of the image recognition model may include the image data of the waste PCB, and an output of the image recognition model may include the first position and the first distribution of the waste PCB.

In some embodiments, the image recognition model may be obtained by training based on a plurality of first training samples and a plurality of first labels, where one of the first training samples corresponds to one of the first labels. For example, the plurality of first training samples and the plurality of first labels are input to an initial image recognition model, a loss function is constructed based on the plurality of first labels and output results predicted by the initial image recognition model, and a parameter of the initial image recognition model is iteratively updated based on the loss function by manners such as gradient descent, etc. The iteration is ended until a preset condition is satisfied and a trained image recognition model is obtained. The preset condition may be that the loss function converges, a count of iterations reaches a threshold, or the like.

In some embodiments, the first training samples may include sample image data of a sample waste PCB, and the first training samples may be obtained based on historical data. The first labels may include an actual first position and an actual first distribution corresponding to the first training sample, and the first label may be obtained based on manual labeling, or the like.

The second position refers to three-dimensional spatial coordinates of the high-value components on the waste PCB in a base coordinate system of the robotic arm.

The second distribution refers to three-dimensional spatial coordinates of the plurality of solder spots on the waste PCB and the type of material used for each of the plurality of solder spots in the base coordinate system of the robotic arm.

In some embodiments, the control system may convert the pixel coordinates (i.e., the first position and the first distribution) recognized and acquired by the high-precision vision system to the three-dimensional spatial coordinates (i.e., the second position and the second distribution) in the base coordinate system of the robotic arm by means of eye-in-hand or eye-to-hand calibration. It is understood that an error of the eye-in-hand or eye-to-hand calibration needs to be controlled to be within ±0.1 mm so as to accurately cut the weak region subsequently.

The robotic arm cutting parameter refers to a parameter related to the robotic arm when the robotic arm cuts the waste PCB. For example, the robotic arm cutting parameter may include a cutting path for cutting the waste PCB.

In some embodiments, the control system may determine the robotic arm cutting parameter based on a path planning model. The path planning model may be a machine learning model. For example, the path planning model may be a Convolutional Neural Network (CNN) model, or the like, or any combination of one or more of other customized models. In some embodiments, the path planning model may also be a rapidly exploring random tree, etc.

In some embodiments, an input of the path planning model may include the second position and the second distribution of the waste PCB, and an output of the path planning model may include the robotic arm cutting parameter.

In some embodiments, the path planning model may be obtained by training based on a plurality of second training samples and a plurality of second labels, where one of the second training samples corresponds to one of the second labels. The training process of the path planning model is similar to the training process of the image recognition model, which is not repeated here.

In some embodiments, the second training samples may include second positions and second distributions of a plurality of sample waste PCBs, and the second training samples may be obtained based on historical data. The second labels may include an actual robotic arm cutting parameter corresponding to the second training sample. In some embodiments, the second labels may be constructed based on the following operations: a plurality of sample waste PCBs being cut based on the second positions and the second distributions of the plurality of sample waste PCBs, and a robotic arm cutting parameter corresponding to a sample waste PCB with a good cutting effect among the plurality of sample waste PCBs being used as the second label. The good cutting effect means that a damage rate of the high-value components is lower than a damage rate threshold during subsequent stirring. The damage rate threshold may be set by those skilled in the art based on experience.

The weak region refers to a region that is susceptible to separation or damage under a mechanical or thermodynamic action. For example, the weak region may include a position on the waste PCB where an aged or oxidized solder spot is located.

In some embodiments, the control system may send the robotic arm cutting parameter to the high-precision vision system, and the high-precision vision system may control the robotic arm and the cutting component to cut the weak area along the cutting path based on the robotic arm cutting parameter.

In some embodiments of the present disclosure, solder spots with thin thickness or incomplete resin filling may be distributed on the waste PCB. Accordingly, the solder spots may be cut out in advance to prevent damage to the high-value components cause by the situation that the solder spots are forced to be split during stirring, thereby improving the recovery rate of the high-value components.

In S3, setting a reaction level of the desoldering flux, placing the waste PCB into the inner tank 2 to cause the waste PCB to be completely submerged in the desoldering flux after a level of the desoldering flux reaches a set position, and stopping adding the waste PCB.

The reaction level of the desoldering flux refers to a level height at which the desoldering flux reacts with all the waste PCB. The set position refers to a level of the desoldering flux when the waste PCB is completely submerged in the desoldering flux, i.e., the reaction level of the desoldering flux. In some embodiments, the reaction level of the desoldering flux may be determined by those skilled in the art based on a count of the waste PCBs, etc.

In S4, the drive motor 6 driving the cylinder 3 to rotate clockwise by 90°, the control system controlling the output shaft of the cylinder 4 to retract to cause the top cover 7 to contact a top of the insulated outer tank 1 to form a seal, and setting an initial stirring duration, an initial stirring speed, and an initial stirring direction.

The initial stirring duration, the initial stirring speed, and the initial stirring direction refer to an initial duration, an initial speed, and an initial direction at which the stirring mechanism 8 stirs the waste PCB and the desoldering flux, respectively. In some embodiments, the initial stirring duration, the initial stirring speed, and the initial stirring direction may be set by those skilled in the art based on experience.

In S5, activating the second heating piece 12 to cooperate with the first heating piece 3 to make a temperature of the desoldering flux rapidly increase to a secondary set temperature, and stopping heating.

In S6, when the temperature of the desoldering flux reaches the secondary set temperature, driving the main rotation shaft 801 and the secondary rotation shafts 802 to rotate, activating the pump body 11 to pump the desoldering flux from a bottom of the inner tank 2 to a top for spraying, after rotation for 5 minutes, controlling the main rotation shaft 801 to move up and down while rotating and controlling the plurality of electromagnets 806 to be energized or de-energized to connect or disconnect a plurality of connection points between the at least two connecting rod 804 and the stirring wheel 805 so as to control a stirring direction of the stirring wheel 805.

In some embodiments, the control system may determine whether there is a malfunction in the plurality of electromagnets 806 based on an oscillation amplitude and an oscillation frequency of the stirring wheel 805; and in response to determining that there is the malfunction in the plurality of electromagnets 806, issue a warning and control spring pins to activate.

The oscillation amplitude refers to a maximum displacement of the stirring wheel 805 that deviates from a standard path during movement. The oscillation frequency refers to a count of times the stirring wheel 805 undergoes periodic oscillation per unit time. The standard path and the unit time may be set by those skilled in the art based on experience.

In some embodiments, an acceleration sensor may be provided on a position of the stirring wheel 805 close to an axis center or a load end of the stirring wheel 805.

The acceleration sensor may obtain the oscillation amplitude and the oscillation frequency of each stirring wheel 805 at a preset interval. The acceleration sensor may include a triaxial acceleration sensor, etc. The preset interval may be set by those skilled in the art based on experience (e.g., 30 min, 1 h, etc.).

For example, the acceleration sensor may obtain acceleration data of the stirring wheel 805 on three mutually perpendicular axes (e.g., X, Y, and Z axes). The control system may denoise the acceleration data through low-pass filtering (LPF), etc., to obtain a filtered acceleration signal; obtain an oscillation frequency f (i.e., a maximum frequency of the amplitude of a spectrum) and a difference (i.e., a difference between a maximum value and a minimum value of the filtered acceleration signal) between a maximum value and a minimum value of a peak based on FFT spectral analysis of the filtered acceleration signal; and determine the oscillation amplitude by an equation (1).

$$A = \frac{a_{peak}}{(2\pi f)^2} \quad (1)$$

where $a_{peak}$ denotes the difference between the maximum value and the minimum value of the peak, f denotes the oscillation frequency, and A denotes the oscillation amplitude.

In some embodiments, in response to determining that the oscillation amplitude is greater than an amplitude threshold and the oscillation frequency is greater than a frequency threshold, the control system may determine that there is the malfunction in the plurality of electromagnets 806. The amplitude threshold and the frequency threshold may be set by those skilled in the art based on experience.

In some embodiments, the control system may obtain energization data during a preset time period at the preset interval. In response to determining that a difference between an actual stirring direction of the stirring wheel 805 and a preset stirring direction corresponding to the energization data is greater than a preset angle threshold, the control system determines that there is the malfunction in the plurality of electromagnets 806. The preset time period and the preset angle threshold may be set by those skilled in the art based on experience.

The energization data refers to data related to an energization situation of the plurality of electromagnets. For example, the energization data may include a plurality of energized electromagnets 806 and an energized time period.

The actual stirring direction refers to an actual stirring direction of the stirring wheel 805. The preset stirring direction refers to a stirring direction of the stirring wheel 805 preset by those skilled in the art.

In some embodiments, the stirring wheel 805 may be provided with two Hall sensors and a magnet. The two Hall sensors may be coaxially disposed and spaced ¼ of a circumference apart. During stirring of the stirring wheel 805, the magnet may rotate with the stirring wheel 805 and generate a phase difference signal, and the two Hall sensors may be triggered sequentially based on the phase difference signal. The control system may determine the actual stirring direction of the stirring wheel 805 based on a triggering sequence of the two Hall sensors.

It is understood that the two Hall sensors may detect an actual stirring angle of the stirring wheel 805. In response to determining that a difference between the actual stirring angle of the stirring wheel 805 and a preset stirring angle corresponding to the energization data is greater than the preset angle threshold, the control system may determine that there is the malfunction in the plurality of electromagnets 806.

In some embodiments of the present disclosure, the control system can accurately determine whether there is the malfunction in the plurality of electromagnets 806 based on the direction difference (the angle difference), which can improve the malfunction detection rate so as to activate the malfunction countermeasures in time, thereby reducing the loss caused by the stirring malfunction.

In some embodiments, in response to determining that the malfunction is recognized in the plurality of electromagnets 806, the control system may issue the warning and control the spring pins to activate based on a preset program. A form of the warning may include, but is not limited to, at least one of an audible and visual alarm or a shutdown alert, etc. The preset program may be set in advance by those skilled in the art.

In some embodiments of the present disclosure, whether there is a malfunction in the plurality of electromagnets 806 is determined based on the oscillation amplitude and the oscillation frequency of the stirring wheel 805, so as to improve the malfunction detection rate and activate the malfunction countermeasures in time, thereby reducing the loss caused by the stirring malfunction.

In S7, when the temperature sensor 14 detects a drop in the temperature, activating the first heating piece 3 and the second heating piece 2 again to increase the temperature to a temperature required for desoldering.

In S8, at the end of the initial stirring duration, the control system controlling the main rotation shaft 801 and the secondary rotation shafts 802 to stop, and then activating reverse rotation.

In S9, as stirring proceeds, the desoldering flux continuously reacting with soldered portions of the high-value components for decomposition, a mass of the desoldering flux gradually decreasing, and when the mass decreases to a certain value, the control system reducing rotation speeds of the main rotation shaft 801 and the secondary rotation shafts 802.

In S10, the control system automatically adjusting the stirring duration according to a proportion of the desoldering flux and the high-value components, and when the mass of the desoldering flux drops to the certain value, stopping the stirring, turning off the stirring mechanism 8, and the main rotation shaft 801 retracting to the top, so that the stirring is completed. The certain value may be a preset value, which may be set in advance by those skilled in the art based on experience.

According to some embodiments of the present disclosure, the high-value components are separated from the waste PCB using the desoldering flux, so that the problems of environmental pollution and waste of resources caused by the existing process of recycling the waste PCB are solved. In addition, the direction of the stirring wheel can be controlled by controlling connection and disconnection of the plurality of connection points between the rotating rod and the stirring wheel so that the desoldering flux and the waste PCB are in full contact with each other, thereby accelerating the separation of the high-value components from the PCB and improving the separation efficiency.

In some embodiments, during the stirring process, the control system may determine, at a preset interval, an updated stirring parameter based on a recycling feature of the waste PCB, a temperature of the desoldering flux, a flow rate of the desoldering flux, and a consumption of the desoldering flux through a parameter determination model; and control operation of the main rotation shaft 801 and the secondary rotation shafts 802 based on the updated stirring parameter.

The recycling feature refers to a feature related to the recycled waste PCB. For example, the recycling feature may include a size, a shape, a material, or the like, of the waste PCB. In some embodiments, the control system may recognize and determine the recycling feature of the waste PCB based on the real-time stirring image acquired by the image acquisition device.

In some embodiments, the temperature of the desoldering flux may be obtained by the temperature sensor 14, the flow rate of the desoldering flux may be obtained by the flow rate sensor 15, and the consumption of the desoldering flux may be obtained by the mass detector 16. More descriptions regarding the temperature sensor 14, the flow rate sensor 15, and the mass detector 16 may be found in FIGS. 1-4 and the related descriptions thereof.

A stirring parameter refers to a parameter related to the stirring mechanism 8 when stirring the waste PCB. In some embodiments, the stirring parameter may include a stirring duration, a stirring speed, and a stirring direction of each stirring wheel.

The updated stirring parameter refers to a stirring parameter adjusted based on the recycling feature of the waste PCB, the temperature of the desoldering flux, the flow rate of the desoldering flux, and the consumption of the desoldering flux.

In some embodiments, the control system may determine the updated stirring parameter through the parameter determination model. The parameter determination model may be a machine learning model, such as a CNN model, or the like, or any combination of one or more of other customized models.

Figure 6:
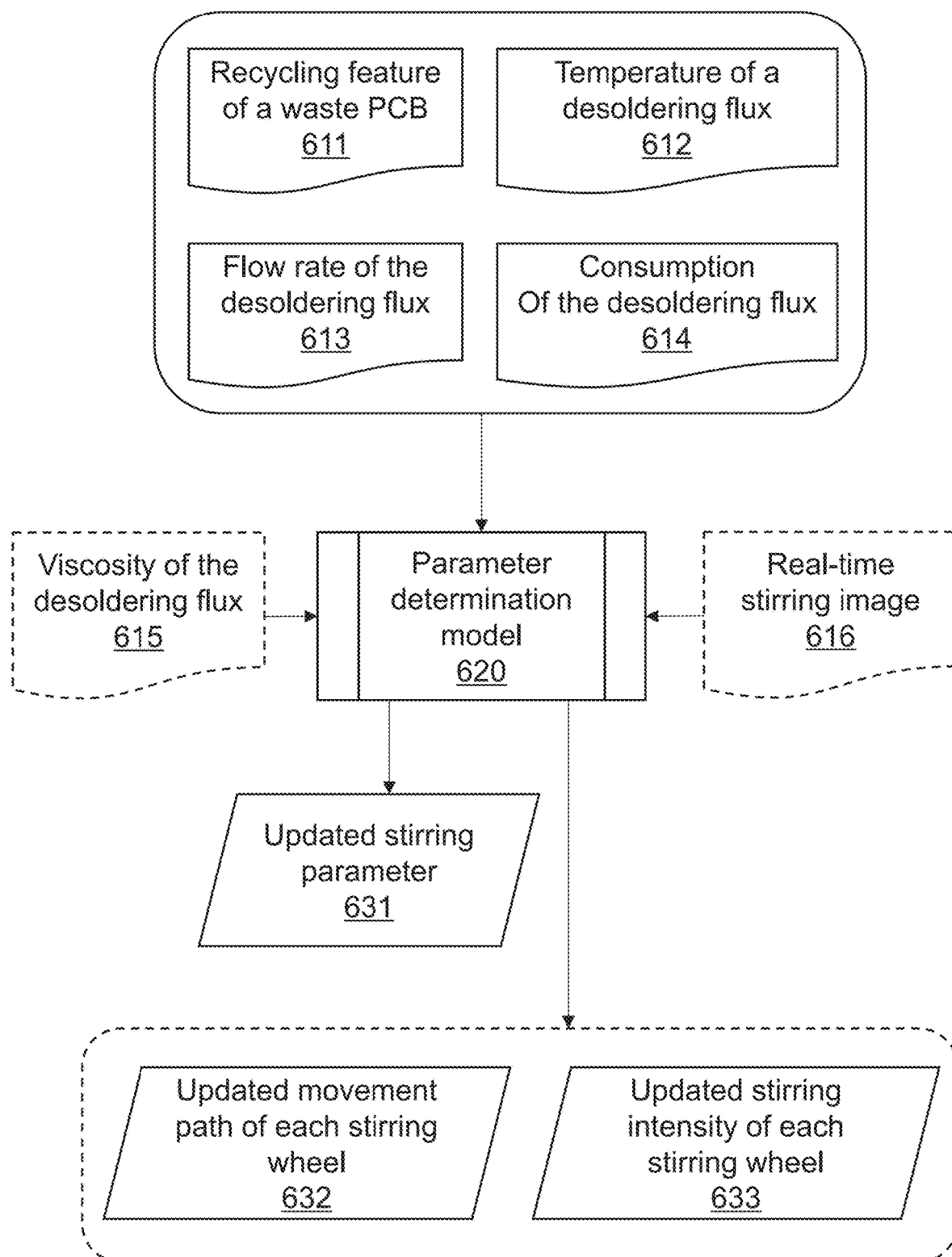
FIG. 6 is a schematic diagram illustrating an exemplary parameter determination model according to some embodiments of the present disclosure.

FIG. 6 is a schematic diagram illustrating an exemplary parameter determination model according to some embodiments of the present disclosure.

In some embodiments, as shown in FIG. 6, an input of a parameter determination model 620 may include a recycling feature of a waste PCB 611, a temperature of a desoldering flux 612, a flow rate of the desoldering flux 613, and a consumption of the desoldering flux 614, an output of the parameter determination model 620 may include an updated stirring parameter 631.

In some embodiments, the parameter determination model may be obtained by training based on a plurality of third training samples and a plurality of third labels, where one of the third training samples corresponds to one of the third labels. The training process of the parameter determination model is similar to the training process of the image recognition model, which is not repeated here.

In some embodiments, the third training samples may include a recycling feature of a sample waste PCB, a temperature of a sample desoldering flux, a flow rate of the sample desoldering flux, and a consumption of the sample desoldering flux. The third training samples may be obtained based on historical data. The third labels may include an actual stirring parameter corresponding to the third training sample. In some embodiments, the third labels may be constructed based on the following operations: after stirring based on a plurality of stirring parameters under the condition of the third training samples, a stirring parameter on which a separation rate of high-value components is greater than a separation rate threshold being used as the third label.

The separation rate threshold may be set by those skilled in the art based on experience.

In some embodiments of the present disclosure, by regulating the stirring parameters, it is possible to make the flow rate of the desoldering flux at various positions in the inner tank more uniform, which ensures that heat and active ingredients of the desoldering flux can be uniformly distributed in the waste PCB, so that the high-value components can be effectively separated from the waste PCB to ensure the recycling effect.

In some embodiments, as shown in FIG. 6, the input of the parameter determination model 620 may further include a viscosity of the desoldering flux 615.

In some embodiments, when the input of the parameter determination model includes the viscosity of the desoldering flux, the third training samples of the parameter determination model may further include a viscosity of the sample desoldering flux.

It is understood that a relatively low stirring speed needs to be set when the viscosity of the desoldering flux is relatively low, so as to prevent air bubbles caused by turbulence. Accordingly, by taking the viscosity of the desoldering flux, the high-value components can be more efficiently separated from the waste PCB.

In some embodiments, the control system may generate a control instruction based on the updated stirring parameter, and control the main rotation shaft 801 and the secondary rotation shafts 802 to operate based on the control instruction, thereby realizing automated control.

In some embodiments, the stirring parameter may further include a movement path of each stirring wheel 805. The control system may adjust a sliding distance of each of the secondary rotation shafts 802, and adjust a telescoping length of each vertical rod 8043 based on an updated movement path of the each stirring wheel 805.

The movement path refers to a trajectory that the each stirring wheel 805 travels during the stirring process. For example, the movement path may include a real-time change trajectory in a height and a horizontal position of the each stirring wheel 805, etc.

In some embodiments, as shown in FIG. 6, the input of the parameter determination model 620 may further include a real-time stirring image 616, and the output of the parameter determination model 620 may further include an updated movement path of each stirring wheel 632 and an updated stirring intensity of each stirring wheel 633.

The real-time stirring image refers to an image related to the stirring mechanism 8 during stirring. In some embodiments, the real-time stirring image may be acquired by an image acquisition device. More descriptions regarding the image acquisition device may be found in FIGS. 1-4 and the related descriptions thereof.

In some embodiments, when the input of the parameter determination model includes the real-time stirring image, the third training samples of the parameter determination model may further include a sample real-time stirring image; the third labels may further include an actual movement path of each stirring wheel corresponding to the third training sample and an actual stirring intensity of each stirring wheel corresponding to the third training sample.

The stirring intensity refers to a force exerted on the waste PCB by the stirring wheel 805 during stirring. In some embodiments, the control system may increase the stirring intensity of the stirring wheel 805 by increasing the stirring speed of the stirring wheel 805. A correlation between the stirring intensity and the stirring speed may be constructed based on historical data.

In some embodiments, the movement path and intensities of different stirring directions of the stirring wheel are determined based on the real-time stirring image, so as to enhance the stirring intensity in a region of dense solder spots and reduce the stirring intensity in a region of sparse solder spots, which can avoid insufficient separation of the high-value components or damage to the high-value components, thereby effectively improving the separation efficiency and quality of separation.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

What is claimed is:

1. A angle-variable stirring and separating device for high-value components of a waste PCB, comprising: an insulated outer tank for accommodating a desoldering flux, wherein the insulated outer tank is provided with a stirring mechanism, the stirring mechanism includes a main rotation shaft, a plurality of spaced cross beams are mounted at a bottom of the main rotation shaft, and each of the cross beams is provided with a secondary rotation shaft, each of the cross beams is provided with a slideway along a length direction of the cross beam, a top of the secondary rotation shaft is embedded in the slideway and slidably connected with the slideway, a bottom of each of the secondary rotation shafts is rotationally connected with a stirring wheel through at least two connecting rods, at least two connection points are formed between each of the at least two connecting rods and the stirring wheel, when any one or more of the at least two connection points are disconnected, the stirring wheel rotates to a different angle.

2. The angle-variable stirring and separating device of claim 1, wherein a bottom of each of the at least two connecting rods is provided with a spherical connecting portion, a top of the stirring wheel is provided with a plurality of connecting assemblies, each of the plurality of connecting assemblies includes an upper connecting portion and a lower connecting portion, the upper connecting portion is provided with an upper groove with a groove opening facing downward, the lower connecting portion is provided with a lower groove with a groove opening facing upward, the upper connecting portion and the lower connecting portion are enclosed to form a spherical groove for mounting the spherical connecting portion, an electromagnet is disposed between the upper connecting portion and the lower connecting portion, and the upper connecting portion, the lower connecting portion, the spherical connecting portion, and the spherical groove correspond to the electromagnet in a one-to-one manner.

3. The angle-variable stirring and separating device of claim 2, wherein a portion of the lower connecting portion located on an outer side of the lower groove is provided with a clamping groove, the electromagnet corresponds to the clamping groove in a one-to-one manner, each electromagnet is fixed at a bottom of the corresponding clamping groove, the upper connecting portion protrudes in a direction of the clamping groove to form a clamping portion, and the clamping portion is clamped into the corresponding clamping groove.

4. The angle-variable stirring and separating device of claim 1, wherein each of the at least two connecting rods includes a horizontal rod and a vertical rod which are rotationally connected, and the vertical rod is a retractable structure.

5. The angle-variable stirring and separating device of claim 1, wherein an inner tank is disposed in the insulated outer tank, an outer side wall of the inner tank is provided with a first heating piece, an inner bottom wall of the inner tank is provided with a second heating piece, and a temperature sensor, a flow rate sensor, and a mass detector are disposed in the inner tank.

6. The angle-variable stirring and separating device of claim 5, wherein a top of the inner tank is provided with a nozzle, a connection line is disposed between the nozzle and a bottom of the inner tank, and the connection line is provided with a pump body.

7. The angle-variable stirring and separating device of claim 1, wherein the main rotation shaft is a retractable structure.

8. The angle-variable stirring and separating device of claim 1, wherein the insulated outer tank is provided with a top cover, a side wall of the insulated outer tank is rotationally connected with a cylinder, an output shaft of the cylinder is connected with the top cover, and a cylinder body of the cylinder is connected with an output shaft of a drive motor.

9. A control method of the angle-variable stirring and separating device for the high-value components of the waste PCB of claim 1, comprising:
- S1: a control system controlling an output shaft of a cylinder to extend to drive a top cover to rise to a set height, causing the stirring mechanism to be completely detached from the insulated outer tank, and a drive motor driving the cylinder to rotate counterclockwise by 90° to open the top cover;
- S2: setting an initial level of a desoldering flux, injecting the desoldering flux into an inner tank until reaching a height of the initial level of the desoldering flux, setting a heating temperature, activating a first heating piece to preheat the desoldering flux in the inner tank, and after heating to a desired temperature, the first heating piece performing constant temperature control;
- S3: setting a reaction level of the desoldering flux, placing the waste PCB into the inner tank to cause the waste PCB to be completely submerged in the desoldering flux after a level of the desoldering flux reaches a set position, and stopping adding the waste PCB;
- S4: the drive motor driving the cylinder to rotate clockwise by 90°, the control system controlling the output shaft of the cylinder to retract to cause the top cover to contact a top of the insulated outer tank to form a seal, and setting an initial stirring duration, an initial stirring speed, and an initial stirring direction;
- S5: activating a second heating piece to cooperate with the first heating piece to make a temperature of the desoldering flux rapidly increase to a secondary set temperature, and stopping heating;
- S6: when the temperature of the desoldering flux reaches the secondary set temperature, driving the main rotation shaft and the secondary rotation shafts to rotate, activating a pump body to pump the desoldering flux from a bottom of the inner tank to a top for spraying, then controlling the main rotation shaft to move up and down while rotating and controlling a plurality of electromagnets to be energized or de-energized to connect or disconnect the at least two connection points between the at least two connecting rods and the stirring wheel so as to control a stirring direction of the stirring wheel;
- S7: when a temperature sensor detects a drop in the temperature, activating the first heating piece and the second heating piece again to increase the temperature to a temperature required for desoldering;
- S8: at the end of the initial stirring duration, the control system controlling the main rotation shaft and the secondary rotation shafts to stop, and then activating reverse rotation;
- S9: as stirring proceeds, the desoldering flux continuously reacting with soldered portions of high-value components for decomposition, a mass of the desoldering flux gradually decreasing, and when the mass decreases to a certain value, the control system reducing rotation speeds of the main rotation shaft and the secondary rotation shafts;
- S10: the control system automatically adjusting the stirring duration according to a proportion of the desoldering flux and the high-value components, and when the mass of the desoldering flux drops to the certain value, stopping the stirring, turning off the stirring mechanism, and the main rotation shaft retracting to the top, so that the stirring is completed.

* * * * *